(12) United States Patent
Gulsun et al.

(10) Patent No.: US 7,953,266 B2
(45) Date of Patent: May 31, 2011

(54) ROBUST VESSEL TREE MODELING

(75) Inventors: Mehmet Akif Gulsun, Lawrenceville, NJ (US); Huseyin Tek, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 959 days.

(21) Appl. No.: 11/838,279

(22) Filed: Aug. 14, 2007

(65) Prior Publication Data

US 2008/0187199 A1     Aug. 7, 2008

Related U.S. Application Data

(60) Provisional application No. 60/888,332, filed on Feb. 6, 2007.

(51) Int. Cl.
    *G06K 9/001* (2006.01)
(52) U.S. Cl. ....................................................... 382/131
(58) Field of Classification Search .......... 382/128–131; 128/922; 378/5, 6, 8, 21, 23, 53, 62
    See application file for complete search history.

(56) References Cited

U.S. PATENT DOCUMENTS

| 5,768,405 | A | * | 6/1998 | Makram-Ebeid | 382/128 |
| 5,771,308 | A | * | 6/1998 | Florent | 382/130 |
| 5,935,076 | A | * | 8/1999 | Smith et al. | 600/479 |
| 6,134,353 | A | * | 10/2000 | Makram-Ebeid | 382/259 |
| 6,947,040 | B2 | | 9/2005 | Tek et al. | |
| 7,738,707 | B2 | * | 6/2010 | Wiedemann et al. | 382/190 |
| 2003/0053697 | A1 | * | 3/2003 | Aylward et al. | 382/203 |
| 2005/0259855 | A1 | * | 11/2005 | Dehmeshki | 382/131 |
| 2006/0023927 | A1 | * | 2/2006 | Zhang et al. | 382/131 |

FOREIGN PATENT DOCUMENTS

DE     102006017113 A1     11/2006

OTHER PUBLICATIONS

Miles et al. (Matched Filter estimation of Serial Blood Vessel Dimaeters from Video Images, IEEE Transaction on medical imaging, vol. 12, No. 2, Jun. 1993).*
Li et al. (A Piecewise Gaussian Model for Profiling and Differentiating Retinal Vessels, IEEE Transaction, School of computing, Singapore, 2003).*
K. Krissian, G. Malandain, N. Ayache R. Vaillant, Y. Trousset, "Model-Based Multiscale Detection of 3D Vessels" IEEE Workshop on Biomédical Image Analysis, 1998; p. 202.
Deschamps and L. Cohen; "Fast extraction of minimal paths in 3D images and applications to virtual endoscopy"; Elsevier 2001; Medical Image Analysis 1 (2001).

* cited by examiner

*Primary Examiner* — Matthew C Bella
*Assistant Examiner* — Shervin Nakhjavan
(74) *Attorney, Agent, or Firm* — Donald B. Paschburg; F. Chau & Associates, LLC

(57) ABSTRACT

A method for extracting a local center-axis representation of a vessel, includes: placing first and second seed points in an image that includes the vessel, wherein the first and second seed points are placed near a beginning and an end of a centerline of the vessel; representing the image as a discrete graph having nodes and edges, wherein the first seed point is a source node and the second seed point is a goal node; and finding a minimum-cost path between the first and second seed points by computing a cost of edges between the first and second seed points, wherein the cost of each edge is reciprocal to a vesselness measure of the edge.

5 Claims, 17 Drawing Sheets (a)

(b)

(c)

(a)

(b)

(a)

(a)          (b)

(a) (b)

(a) (b)

(a)

(b)

(c)

(a)

(b)

(c)

(a)

(b)

(a)

(b)

(c)

(d)

(e)

(f)

(g)

(h)

ROBUST VESSEL TREE MODELING

CROSS-REFERENCE TO RELATED APPLICATION

This application claims the benefit of U.S. Provisional Application No. 60/888,332, filed Feb. 6, 2007, the disclosure of which is incorporated by reference herein in its entirety.

BACKGROUND OF THE INVENTION

1. Technical Field

The present invention relates to vessel tree modeling.

2. Discussion of the Related Art

Segmentation and modeling of vascular structures from contrast enhanced (CE) Cardiac Computed Tomography Angiography (CTA)/Cardiac Magnetic Resonance Angiography (MRA) is often a necessary task for diagnosis, treatment planning and follow-up studies. While recent technological advances in image acquisition devices such as new multi-detector CT machines, allow an increase in the spatial resolution of image data; accurate and timely segmentation and modeling of blood vessels is still a challenging task in many applications. For example, intensity contrast may change drastically along vessels; vessels may touch each other near bright structures such as bone or other vessels; a single vessel tree can have large and small vessels due to a significant scale change; and local vessel structure may deviate from a tubular shape due to the presence of pathological conditions such as stenosis.

There are a broad variety of vessel segmentation and modeling algorithms ranging from basic thresholding and region growing to more complex deformable model techniques such as modeling vessels directly from an image, e.g., without an explicit segmentation step. Traditionally, binary vessel masks were created by a vessel segmentation algorithm as described, e.g., in A. Chung and J. A. Noble. Statistical 3D vessel segmentation using a Rician distribution. In MICCAI, pages 82-89, 1999; K. Siddiqi and A. Vasilevskiy. 3d flux maximizing flows. In International Workshop on Energy Minimizing Methods In Computer Vision, 2001; and D. Nain, A. Yezzi, and G. Turk. Vessel segmentation using a shape driven flow. In *MICCAI*, 2004.

Centerline models of the binary vessel masks can be extracted by shortest paths algorithms as described, e.g., in B. B. Avants and J. P. Williams. An adaptive minimal path generation technique for vessel tracking in CTA/CE-MRA volume images. In Medical Image Computing and Computer-Assisted Intervention MICCAI, pages 707-716, 2000; and T. Deschamps and L. Cohen. Fast extraction of minimal paths in 3d images and applications to virtual endoscopy. Medical Image Analysis, 5(4):281-299, 2001.

Alternatively, vessel centerlines can be constructed directly from images by the use of vesselness as described, e.g., in T. M. Koller, G. Gerig, and G. S. and D. Dettwiler. Multiscale detection of curvilinear structures in 2-d and 3-d image data. In ICCV, pages 864-869, 1995; A. F. Frangi, W. J. Niessen, K. L. Vincken, and M. A. Viergever. Multiscale vessel enhancement filtering. In MICCAI, pages 82-89, 1998; and O. Wink, W. J. Niessen, and M. A. Viergever. Multiscale vessel tracking. IEEE Trans. on Medical Imaging, 23(1):130-133, 2004, medialness filters as described, e.g., in S. Aylward, S. Pizer, E. Bullitt, and D. Eberly. Intensity ridge and widths for 3d object segmentation and description. In IEEE Proc. Workshop MMBIA, pages 131-138, 1996; and S. Aylward and E. B. E. Initialization, noise, singularities, and scale in height-ridge traversal for tubular object centerline extraction. TMI, 21(2):61-75, 2002, or superellipsoids as described, e.g., in J. A. Tyrrell, E. di Tomaso, D. Fuja, R. Tong, K. Kozak, E. B. Brown, R. Jain, and B. Roysam. Robust 3-d modeling of vasculature imagery using superellipsoids. IEEE Transactions on Medical Imaging, 2006. Surface models can then be obtained from scale information contained in these filters.

In general, vessel surface models as well as centerline models are needed for visualization and quantification of vascular structures. Traditionally, scale information stored on centerlines was used to reconstruct the surface models. However, in real applications, such constructions are often not accurate enough to quantify vascular pathologies since they are estimated from simple models due to computation reasons. Especially since small vessels such as coronaries require accurate surface reconstruction at the subvoxel level.

SUMMARY OF THE INVENTION

In an exemplary embodiment of the present invention, a method for computing a vesselness measure comprises: initializing a plurality of rays from a center point of a vessel and collecting an intensity profile of the vessel and a background of the vessel along each ray; modeling each intensity profile by dividing the intensity profile into first, second and third intervals, wherein the first interval represents an intensity value inside the vessel, the second interval represents an intensity value outside the vessel and the third interval represents an intensity value between a boundary of the vessel and the background; for each ray, obtaining a difference between an originally measured intensity profile of the vessel and the background and the originally measured intensity profile's corresponding modeled intensity profile, wherein the difference is a fit measure of the ray; and summing the fit measures for each ray, wherein the total sum is the vesselness measure.

The vesselness measure along a ray is strong near a center of the ray, drops rapidly near a boundary of the ray and is weak in a non-vascular area between the ray and another ray. The vessel is a blood vessel.

In an exemplary embodiment of the present invention, a method for extracting a local center-axis representation of a vessel comprises: placing first and second seed points in an image that includes a vessel, wherein the first and second seed points are placed near a beginning and an end of a centerline of the vessel; representing the image as a discrete graph having nodes and edges, wherein the first seed point is a source node and the second seed point is a goal node; and finding a minimum-cost path between the first and second seed points by computing a cost of edges between the first and second seed points, wherein the cost of each edge is reciprocal to a vesselness measure of the edge.

The vesselness measure of an edge is computed orthogonal to the edge. Fronts propagate fast towards a center of the vessel and slow towards walls of the vessel. The vessel is a blood vessel.

In an exemplary embodiment of the present invention, a method for vessel tree modeling comprises: computing minimum cost paths from a single source located in a vessel of a vessel tree; and computing centerlines of the vessel tree by using an accumulative cost map of the minimum cost paths, wherein the centerlines correspond to respective vessels in the vessel tree.

Wherein computing the minimum cost paths from a single source comprises: placing a seed point in an image that includes the vessel tree; representing the image as a discrete graph having nodes and edges, wherein a cost of each edge is computed from a vesselness measure of the edge; starting a minimum cost propagation from the seed point by first setting an accumulative minimum cost at the seed point to zero and to infinity at every other point in the graph; representing discrete fronts that propagate by minimizing an accumulated vesselness measure, wherein the discrete fronts are pixels that separate pixels that have already been explored from pixels that have not yet been explored; computing the minimum cost propagation from the source for a first number of iterations by computing accumulative minimum costs and setting stop points of the discrete fronts as new sources; and re-computing accumulative minimum costs for each new source by propagating fronts from the new sources for a second number of iterations, wherein if the re-computed accumulative minimum costs are below a first threshold the minimum cost propagation is stopped and pixels that correspond to the discrete fronts that have been stopped are represented as sinks.

The first number of iterations is greater than the second number of iterations.

Computing centerlines of the vessel tree by using an accumulative cost map of the minimum cost paths comprises: computing a distance from the originally placed seed to the sinks; ordering the sinks based on their corresponding computed distances; selecting a pixel having the largest distance and backtracking until the originally placed seed is reached or until a previously detected path is reached to detect a centerline path; computing a distance of the detected centerline and assigning the detected centerline to its corresponding sink; determining a radius along the detected centerline that corresponds to a maximum vesselness measure along the detected centerline; setting a saliency of the selected pixel by dividing the distance of the centerline by the radius; removing the selected pixel from the ordered list; and when the ordered list is empty, selecting pixels whose saliency is greater than a second threshold, wherein centerlines between the selected pixels and the originally placed seed correspond to respective vessels in the vessel tree.

The vessel is a blood vessel.

In an exemplary embodiment of the present invention, a system for computing a vesselness measure comprises: a memory device for storing a program; a processor in communication with the memory device, the processor operative with the program to: initialize a plurality of rays from a center point of a vessel and collect an intensity profile of the vessel and a background of the vessel along each ray; model each intensity profile by dividing the intensity profile into first, second and third intervals, wherein the first interval represents an intensity value inside the vessel, the second interval represents an intensity value outside the vessel and the third interval represents an intensity value between a boundary of the vessel and the background; for each ray, obtain a difference between an originally measured intensity profile of the vessel and the background and the originally measured intensity profile's corresponding modeled intensity profile, wherein the difference is a fit measure of the ray; and sum the fit measures for each ray, wherein the total sum is the vesselness measure.

The vesselness measure along a ray is strong near a center of the ray, drops rapidly near a boundary of the ray and is weak in a non-vascular area between the ray and another ray.

In an exemplary embodiment of the present invention, a system for extracting a local center-axis representation of a vessel comprises: a memory device for storing a program; a processor in communication with the memory device, the processor operative with the program to: place first and second seed points in an image that includes a vessel, wherein the first and second seed points are placed near a beginning and an end of a centerline of the vessel; represent the image as a discrete graph having nodes and edges, wherein the first seed point is a source node and the second seed point is a goal node; and find a minimum-cost path between the first and second seed points by computing a cost of edges between the first and second seed points, wherein the cost of each edge is reciprocal to a vesselness measure of the edge.

The vesselness measure of an edge is computed orthogonal to the edge. Fronts propagate fast towards a center of the vessel and slow towards walls of the vessel.

In an exemplary embodiment of the present invention, a system for vessel tree modeling comprises: a memory device for storing a program; a processor in communication with the memory device, the processor operative with the program to: compute minimum cost paths from a single source located in a vessel of a vessel tree; and compute centerlines of the vessel tree by using an accumulative cost map of the minimum cost paths, wherein the centerlines correspond to respective vessels in the vessel tree.

The processor is further operative with the program when computing the minimum cost paths from a single source to: place a seed point in an image that includes a vessel; represent the image as a discrete graph having nodes and edges, wherein a cost of each edge is computed from a vesselness measure of the edge; start a minimum cost propagation from the seed point by first setting an accumulative minimum cost at the seed point to zero and to infinity at every other point in the graph; represent discrete fronts that propagate by minimizing an accumulated vesselness measure, wherein the discrete fronts are pixels that separate pixels that have already been explored from pixels that have not yet been explored; compute the minimum cost propagation from the source for a first number of iterations by computing accumulative minimum costs and setting stop points of the discrete fonts as new sources; and re-compute accumulative minimum costs for each new source by propagating fronts from the new sources for a second number of iterations, wherein if the re-computed accumulative minimum costs are below a first threshold the minimum cost propagation is stopped and pixels that correspond to the discrete fronts that have been stopped are represented as sinks.

The first number of iterations is greater than the second number of iterations.

The processor is further operative with the program when computing centerlines of the vessel tree by using an accumulative cost map of the minimum cost paths to: compute a distance from the originally placed seed to the sinks; order the sinks based on their corresponding computed distances; select a pixel having the largest distance and backtrack until the originally placed seed is reached or until a previously detected path is reached to detect a centerline path; compute a distance of the detected centerline and assign the detected centerline to its corresponding sink; determine a radius along the detected centerline that corresponds to a maximum vesselness measure along the detected centerline; set a saliency of the selected pixel by dividing the distance of the centerline by the radius; remove the selected pixel from the ordered list; and when the ordered list is empty, select pixels whose saliency is greater than a second threshold, wherein centerlines between the selected pixels and the originally placed seed correspond to respective vessels in the vessel tree.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention

DETAILED DESCRIPTION OF EXEMPLARY EMBODIMENTS

Presented herein is a robust and accurate method for extracting center-axis representation and surface models of blood vessels in contrast enhanced (CE)-Cardiac Computed Tomography Angiography (CTA)/Cardiac Magnetic Resonance Angiography (MRA). In this method, local center-axis representation of vessels is constructed by a minimum-cost path detection algorithm. The cost of edges of a discrete graph used by the algorithm is computed by a novel vesselness filter technique that is based on multi-scale cross-sectional vessel boundary and intensity models. A full vessel centerline representation is then constructed by the novel use of the local modeling technique that forces propagation to stay on the vascular structures. The method constructs centerline models very quickly and accurately. In addition, the method is capable of constructing centerline representations for areas where vessels contain strong pathologies such as stenosis, without additional user interactions and excessive computations. In addition to centerline representations, we introduce a vessel surface modeling technique that uses two-dimensional (2D) cross-sectional boundary segmentations along centerlines. The accuracy of the method for extracting center-axis representation and surface models of blood vessels is illustrated on several data sets including different types of vessels such as coronary, carotid, peripheral, etc.

Vesselness Measure from 2D Cross-Sectional Models

Figure 1:
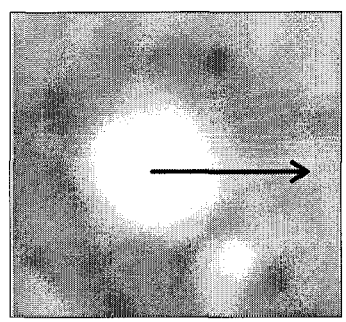
FIG. 1 illustrates multi-scale cross-sectional vessel modeling according to an exemplary embodiment of the present invention.
Figure 1:
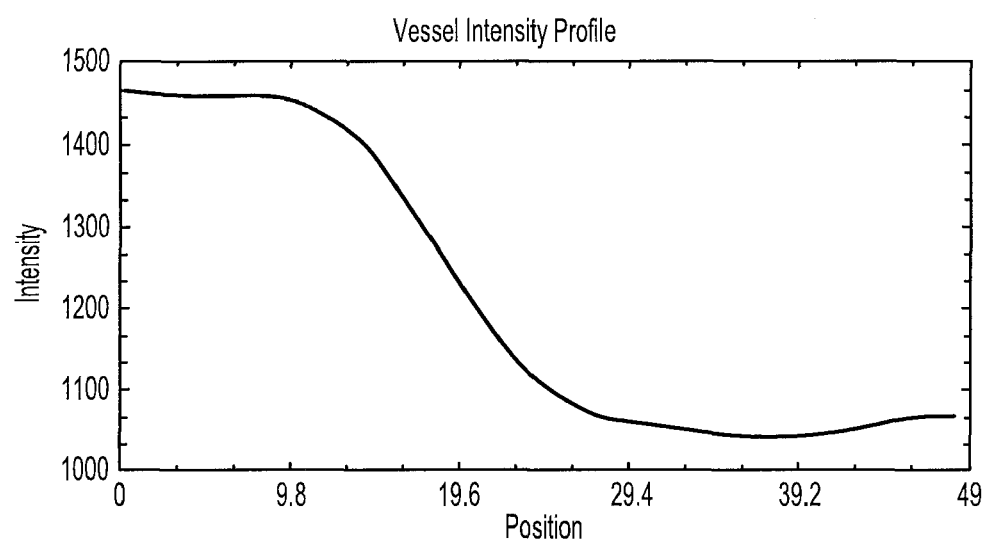
Figure 1:
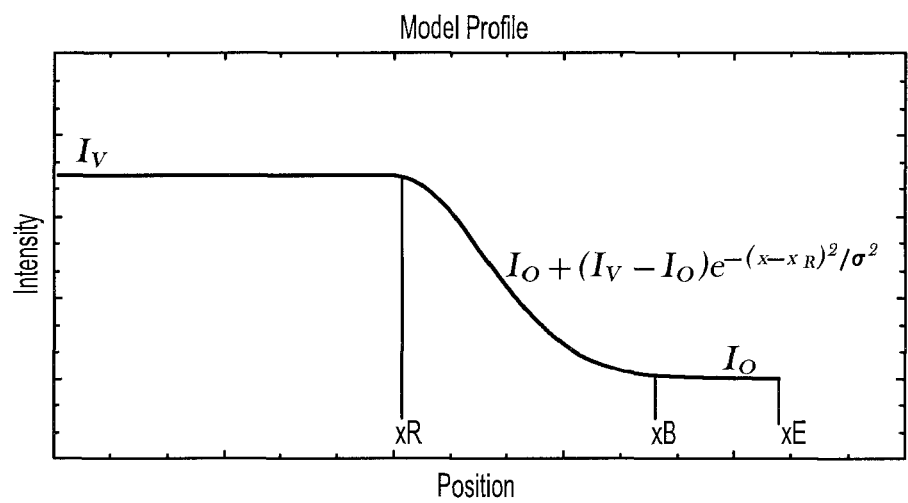
Figure 13:
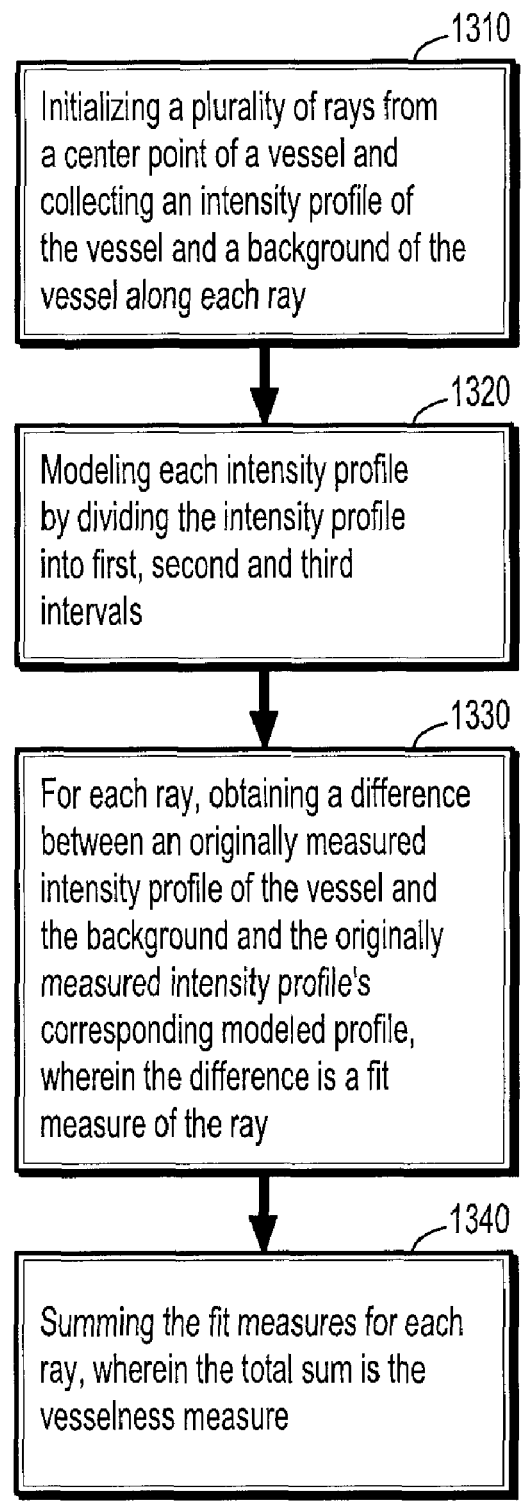
FIG. 13 illustrates a method for computing a vesselness measure from a 2D cross-sectional model of a vessel according to an exemplary embodiment of the present invention.

In this section, we present a novel technique (see 1310-1340 of FIG. 13) for computing a vesselness measure that is based on multi-scale cross-sectional vessel modeling. Blood vessels in CTA/MRA typically have circular/elliptic shapes in cross-sectional views even though local variations on the vessels are not uncommon due to the presence of nearby vessels or pathological conditions. Ideally, a 2D cross-sectional vessel profile consists of a circular/elliptic bright disk and a dark ring around it (see (a) in FIG. 1). Our vesselness measure uses this circularity assumption and intensity profile. Specifically, we initialize a number of rays from the center point and collect intensity profiles along the rays. The typical intensity profile of a vessel and its immediate background along a ray starting from the center is shown in (b) of FIG. 1. This one-dimensional (1D) vessel intensity model is further divided into three intervals, $R_I$, $R_O$, $R_B$, as detailed in (c) of FIG. 1. Specifically, the inside region of a vessel along a ray, $R_I$ is represented by a bright intensity region whose size depends on the size of the vessel. Similarly, the outside region of a vessel along a ray $R_O$ is represented by a dark intensity region whose size depends on the presence of nearby structures. The boundary region between vessel and background, $R_B$ is described by a Gaussian profile.

Mathematically, the vessel model along a ray is $$V(x, R, \sigma) = \begin{cases} I_V & \text{if } x \geq 0 \text{ and } x < r \\ I_O + (I_V - I_O)e^{-(x-R)^2/\sigma^2} & \text{if } x \geq R \text{ and } x < x_B \\ I_O & \text{if } x \geq x_B \text{ and } x < x_E \end{cases} \quad (1)$$

where R is the radius and $I_V$ and $I_O$ are the intensity values representing the inside and outside a vessel, respectively. Intensity data, I obtained from an original CTA/MRA dataset along a ray should match the profile of 1D intensity vessel model, V, if the observed data I is obtained from a vessel. Specifically, we use the difference between measured intensity profile, I and vessel model V as a fit measure in our vesselness criteria.

The fit measure $f_i$, along a ray is given by $$f_i = \operatorname*{argmin}_{R,\sigma} \begin{pmatrix} \gamma_1 \sum_{x=0}^{R} \|V_i(x, R, \sigma) - I_i(x)\|^2 f(x) + \\ \gamma_2 \sum_{x=R}^{x_0} \|V_i(x, R, \sigma) - I_i\|^2 + \\ \gamma_3 \sum_{x=x_B}^{x_B} \|V_i(x, R, \sigma) - I_i\|^2 g(x) \end{pmatrix} \quad (2)$$

where $f(x)=u(I_V-I(x))$, $g(x)=u(I(x)-I_O)$ and $u(x)$ is a step function. $\gamma_1$, $\gamma_2$ and $\gamma_3$ are weights for the different intervals. Observe that calcifications are not modeled separately and they are included inside vessels via the use of f(x). Similarly, very dark regions such as air in the lungs are included in background representation via g(x). Then, the vesselness measure VM(x,y,z) of a point is given from the summation of such fit measures along all rays, $$VM(x, y, z) = \frac{1}{\sum_{i=1}^{N} f_i}$$

where N is the total number of rays.

Figure 9:
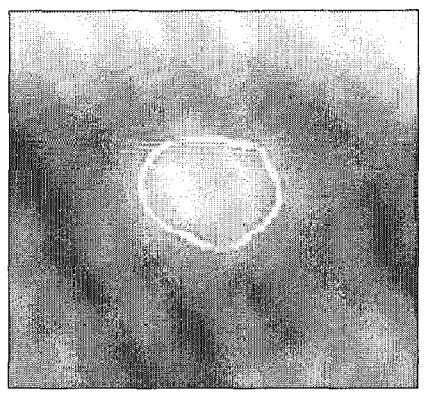
FIG. 9 illustrates two-dimensional (2D) vessel cross-sectional boundaries obtained according to an exemplary embodiment of the present invention.
Figure 9:
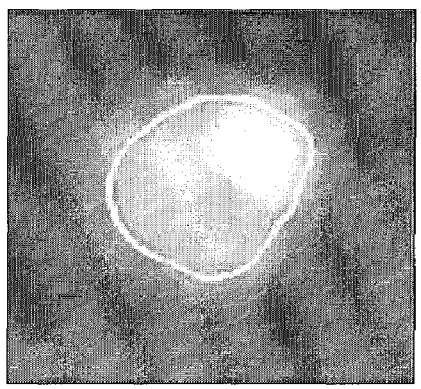
Figure 9:
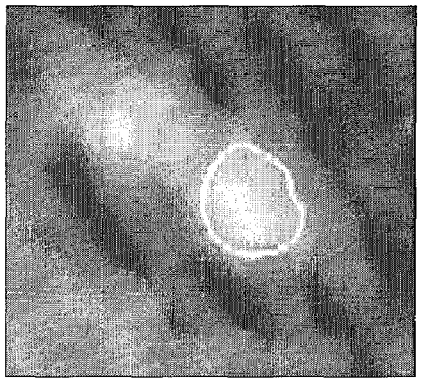

Observe that our vessel intensity model contains two important values, namely, $I_V$ and $I_O$. Their values play a strong role in the accuracy of the vesselness measure. In our implementation, these values are locally estimated in great accuracy by computing 2D cross-sectional boundaries in many directions as described, e.g., in H. AAAA, A. Ayvaci, and D. Comaniciu. Multi-scale vessel boundary detection. In Workshop of CVBIA, pages 388-398, 2005 (the disclosure of which is incorporated by reference herein in its entirety), and using the boundary that gives the best fit to an elliptic Fourier descriptor as shown in FIG. 9. It should be noted that this algorithm detects 2D boundaries and classifies the intensities of the vessel and its surroundings via multi-scan mean shift filtering as described, e.g., in D. Comaniciu and P. Meer. Mean shift: A robust approach toward feature space analysis. IEEE Trans. PAMI, 24(5):603-619, 2002 (the disclosure of which is incorporated by reference herein in its entirety). Specifically, mean-shift filtering produces discontinuity preserving smoothing which then specifies $I_V$ and $I_O$.

Figure 2:
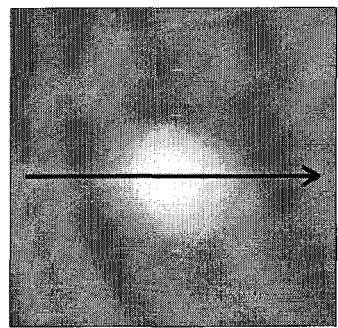
FIG. 2 illustrates vesselness responses along two different rays according to an exemplary embodiment of the present invention.
Figure 2:
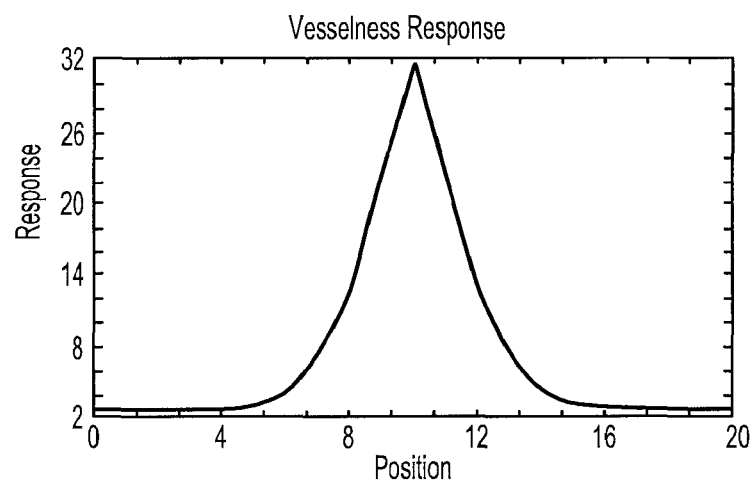
Figure 2:
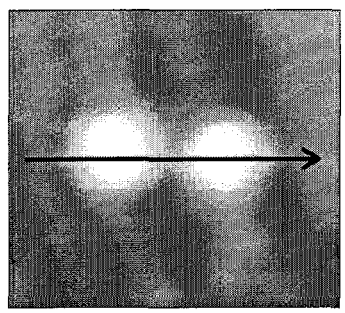
Figure 2:
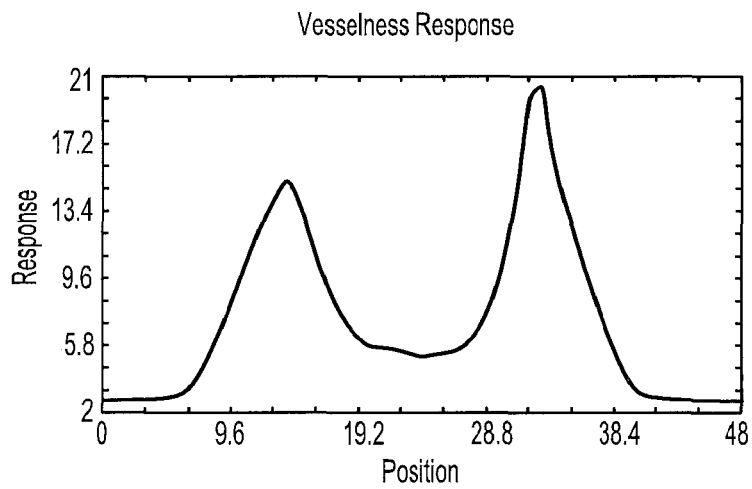
Figure 3:
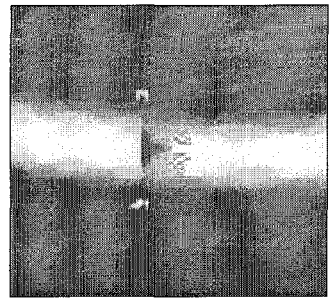
FIG. 3 illustrates a vesselness response of a point when vesselness filters are applied at different orientations according to an exemplary embodiment of the present invention.
Figure 3:
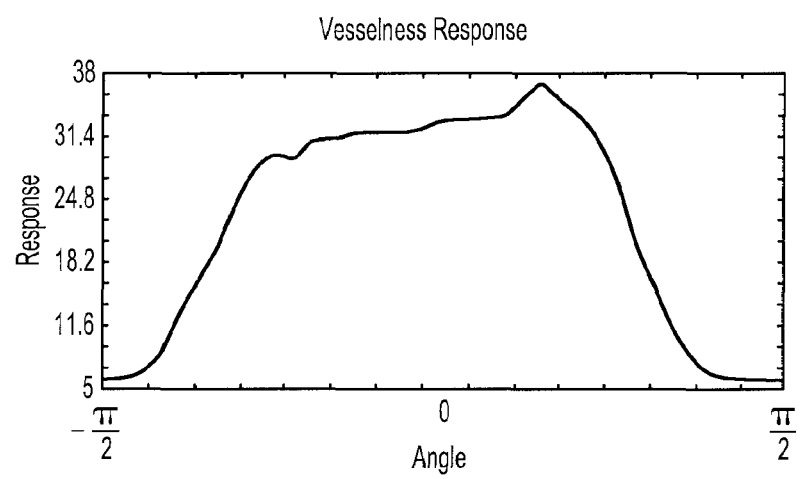

The technique for computing a vesselness measure presented herein has two major contributions. First, its response characteristics are very close to response characteristics that might be expected from an ideal vesselness filter. Specifically, the proposed vesselness measure gives strong responses at the center of a vessel, the responses drop rapidly towards vessel boundaries and very small responses are obtained in non-vascular areas (see (a) in FIG. 2). In addition, the presence of a bright structure does not have a strong impact on the responses. In fact, unlike Hessian based techniques, our approach gives a very low response between two nearby vessels which may then result in better separation of nearby vessels via segmentation algorithms using such measures (see (b) in FIG. 2). Second, our technique does not require the estimate of vessel direction. Other techniques use eigenvectors of the Hessian to determine the vessel direction. However, bright structures close to the vessel of interest can erroneously effect the direction of the vessel, and thus, the vesselness measure. Our filtering technique produces very good responses when they are computed from orthogonal planes. The response drops rapidly when they are computed from oblique planes (see (a) in FIG. 3) which is in agreement with an ideal vesselness filter.

Local Center-Axis from Graph-Based Optimization

Figure 14:
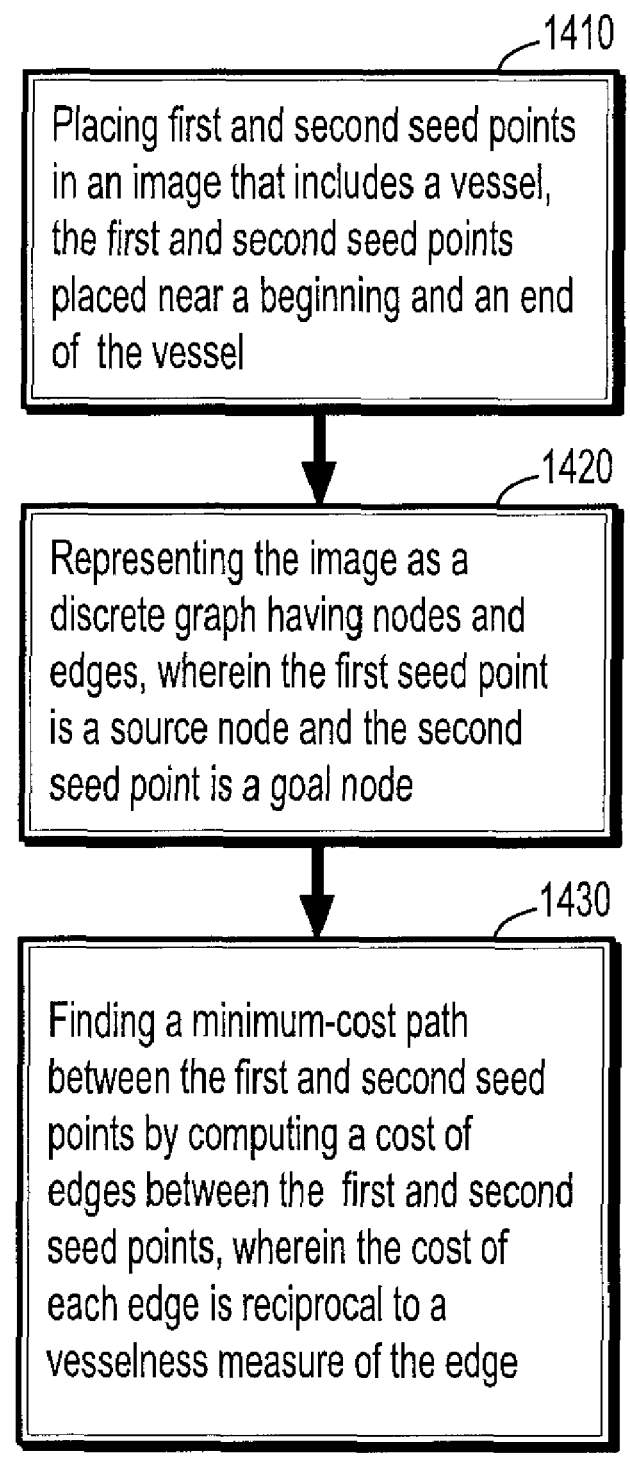
FIG. 14 illustrates a method for extracting a local center-axis representation of a vessel according to an exemplary embodiment of the present invention.

In this section, we present an algorithm (see 1410-1430 of FIG. 14) for extracting local center-axis representation of vessels robustly and quickly. This local technique will then be used as a basis for the modeling of a full vessel tree. Specifically, our approach is based on graph-based minimum-cost path (or front propagation) detection algorithm which operates on the vesselness map obtained from our algorithm.

Figure 4:
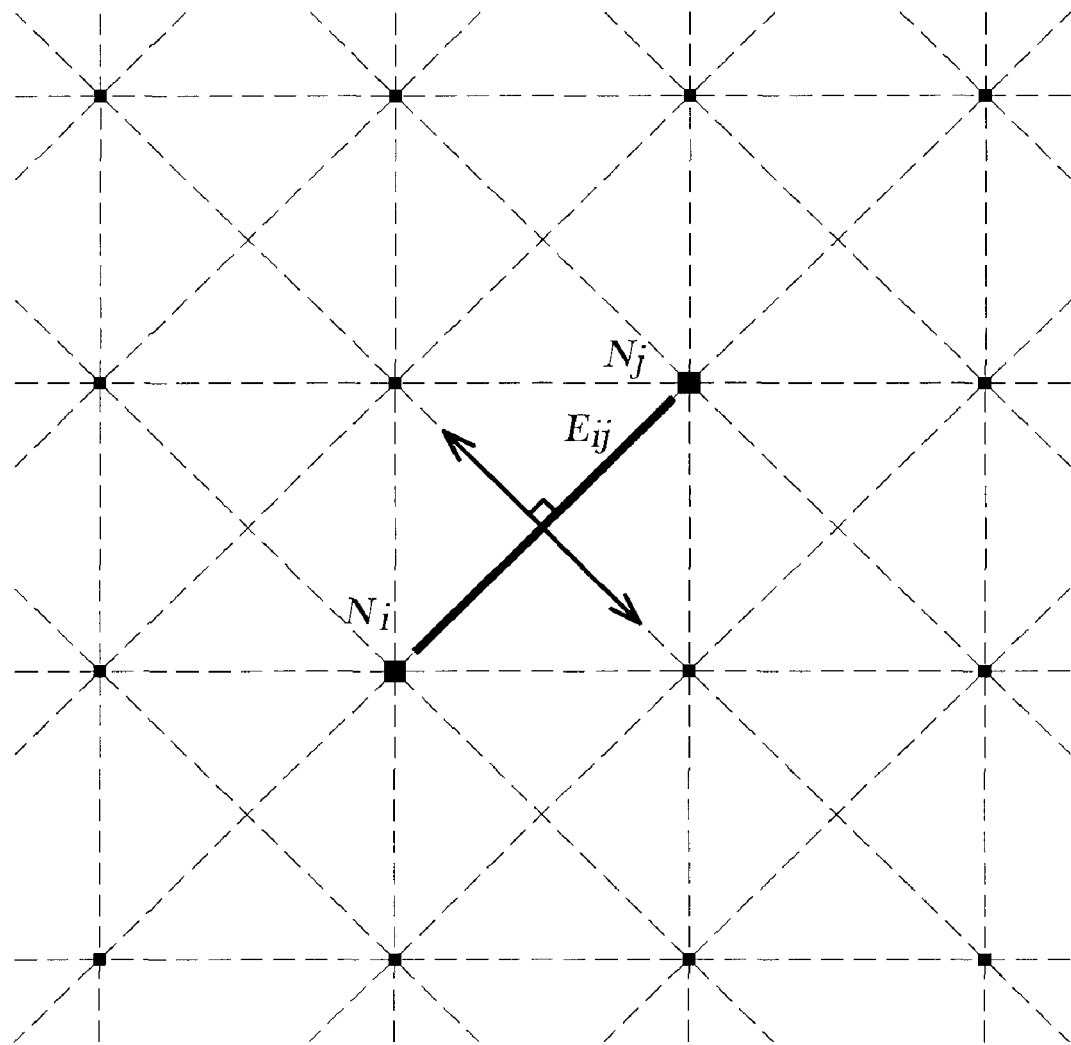
FIG. 4 illustrates a discrete graph where vesselness filters are applied orthogonal to its edges according to an exemplary embodiment of the present invention.

Let G=(N, E) be a discrete graph where N and W represent nodes and edges, respectively. In general, Dijkstra's shortest paths are very popular in finding minimum-cost path between a source $N_s$ and a goal $N_g$. In this section, we use such an algorithm for computing discrete paths that are proposed as the local center axis representation of vessels in medical images. The optimization takes place on this discrete graph G where the cost of edges C(E) are chosen to be the reciprocal of the vesselness measure, e.g., $C(E_{ij})=1.0/VM(E_{ij})$. The vesselness measure of a graph edge is computed orthogonal to that edge as shown in FIG. 4.

In summary, Dijkstra's algorithm (or front propagation algorithm) propagates fronts in the discrete domain and assigns minimum cumulative cost measures to nodes, $\phi(N)$ and keeps the history of propagation from the source to the goal, H(N) which is used in constructing the minimum cost path. The accumulative cost map, $\phi$ and H are constructed by an explicit discrete front propagation where propagation always takes place from the minimum value to the neighboring nodes. For example, suppose that node $N_j$ is visited by a front originated from node $N_i$ via the edge between them, $E_{ij}$, as shown in FIG. 4. It should be noted that all unvisited nodes are initialized as $\phi(N_j)=\infty$. If the front at $N_i$ brings a lower cost to $N_j$, e.g., $(\phi(N_i)+C(E_{ij})<\phi(N_j))$, the cumulative costs and history at $N_j$ are updated as follows:

$$\phi(N_j)=\phi(N_i)+C(E_{ij})$$

$$H(N_j)=N_i \qquad (3)$$

and Nj inserted to the explicit front list where the nodes are sorted by their cumulative cost measure, $\phi$. This explicit font propagation terminates when the propagation reaches the goal node, $N_g$. The minimum cost path between source and goal can be easily detected from the history map, H.

Figure 5:
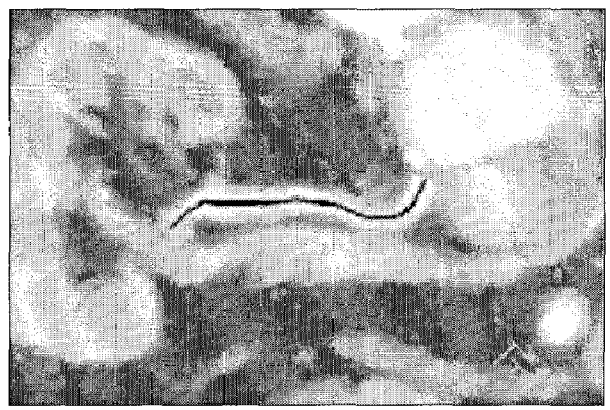
FIG. 5 illustrates computed local center axis models between two user placed seed points according to an exemplary embodiment of the present invention.
Figure 5:
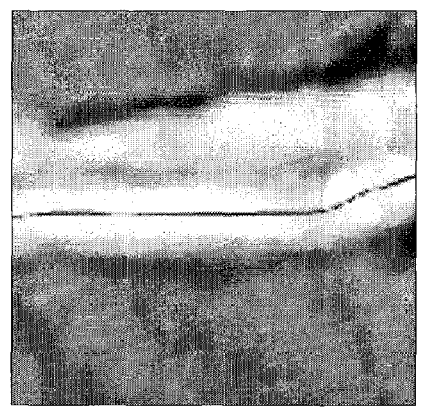

The major contribution of this minimum-cost path finding algorithm is the use of vesselness measure as the cost of edges E and its orthogonal computation to the edges, an example of which is shown in FIG. 4. In fact, this orthogonal computation is the key factor for accuracy and computational efficiency since the costs obtained on vessel cross-sections are very small. In other words, fronts propagate much faster towards the center of vessels and much slower towards vessel walls due to this fact. In fact, the centerline extraction algorithm may also be viewed as a minimum-cost cross-sectional plane estimation algorithm. Images (a) and (b) of FIG. 5 illustrate the centerlines obtained between two seeds from this algorithm. Specifically, note that the presence of a nearby vessel does not effect the center axis representation.

Vessel Tree Extraction and Surface Modeling

Figure 6:
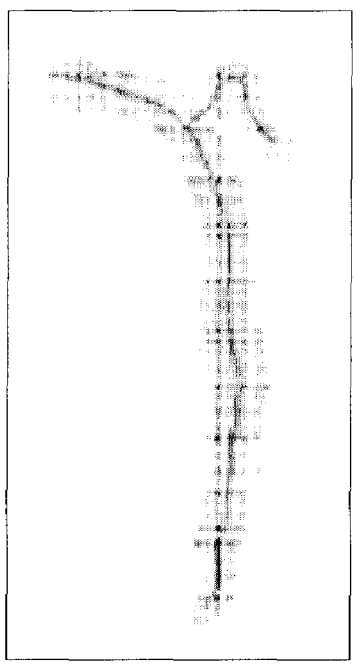
FIG. 6 illustrates computational efficiency of a vessel tree extraction algorithm according to an exemplary embodiment of the present invention.
Figure 6:
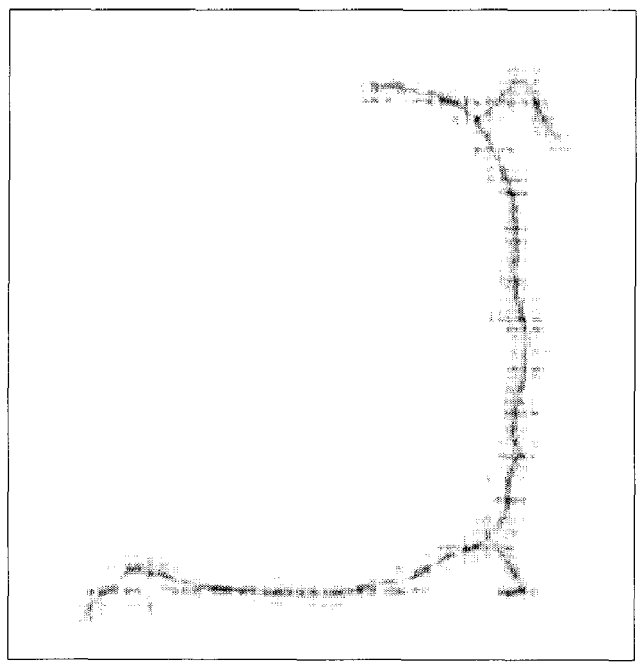

Most centerline extraction algorithms are designed to work on a local segment of a vessel, e.g., between two seed points. However, robust and timely construction of a full vessel tree is still a challenging task. The main source of this problem mostly stems from the vesselness measure. Ideally vesselness response should be very high in the center of vessels, very small towards vessel boundaries and zero outside vessels. However, it is almost impossible to design such a vesselness filter. In reality, non-vascular structures give small but relatively high vesselness response. The minimization algorithm presented above accumulates the vesselness measures during the growth process. At the beginning, fronts propagate faster inside vessels but this propagation becomes slower after a large number of iterations and fronts start to grow towards vessel boundaries due to the accumulative nature of the algorithm. This expansion towards the vessel wall and ultimately outside the vessel becomes significant when expanding fronts encounter stenosis or aneurysms where the vesselness measure drops. Image (a) of FIG. 6 illustrates this on coronary data.

Figure 15A:
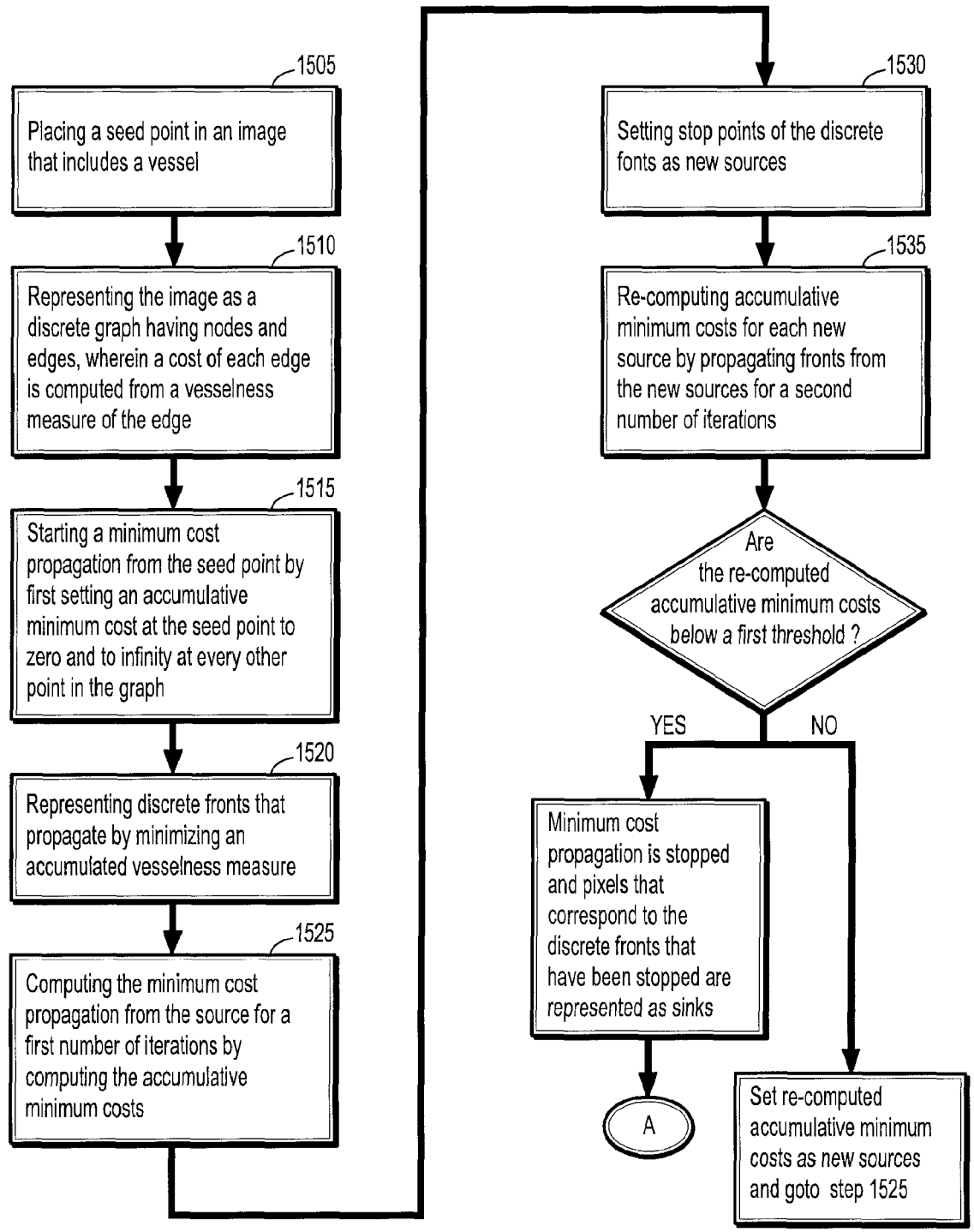
FIGS. 15A and 15B illustrate a method for vessel tree modeling according to an exemplary embodiment of the present invention.
Figure 15B:
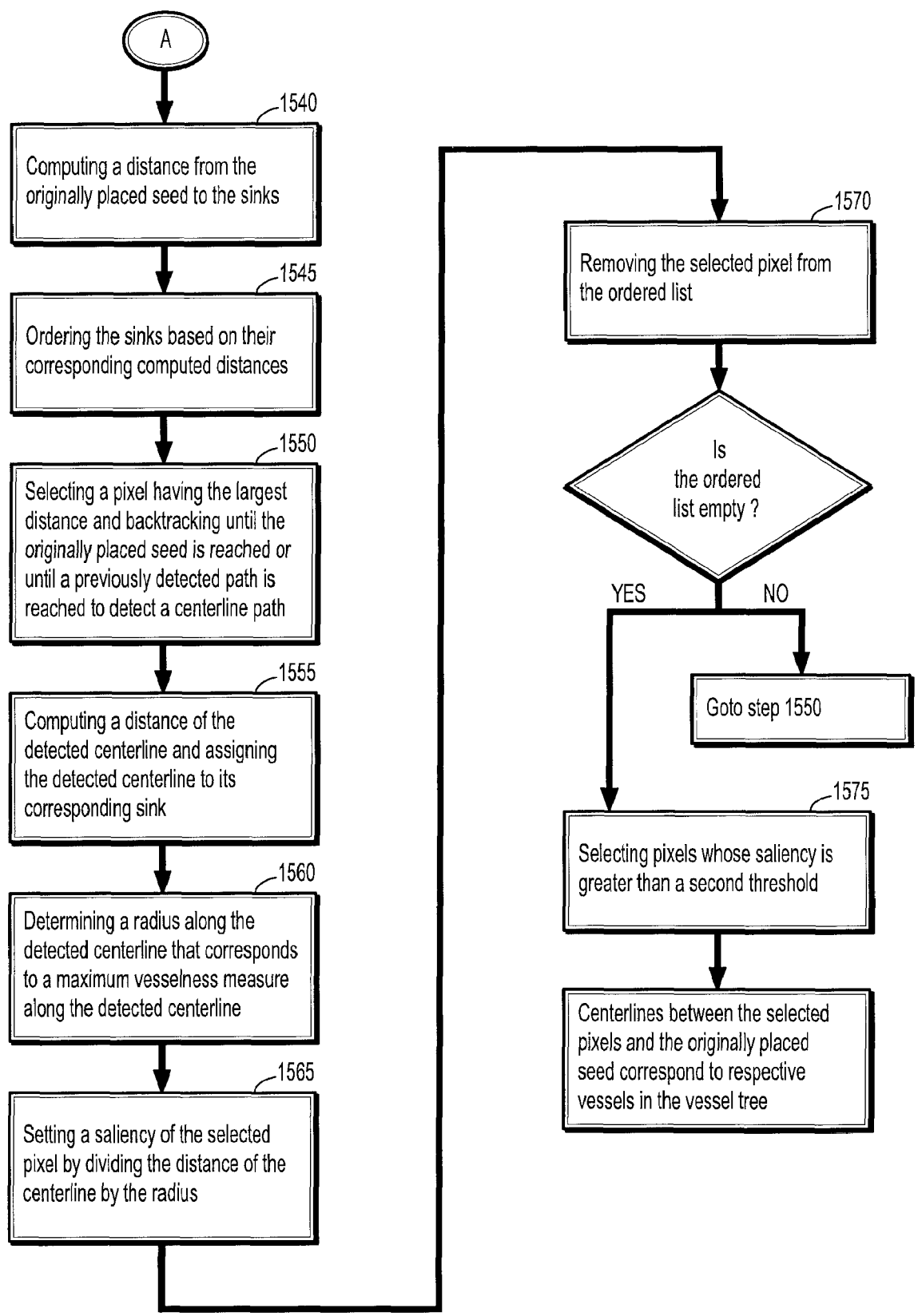

Observe that the graph based minimization algorithm is successful in capturing center-axis locally. In the following, we propose to use this algorithm iteratively until a desired level vessel tree is captured (see 1505-1575 of FIGS. 15A and 15B). Specifically, fronts are explicitly forced to terminate after a certain amount of expansion that corresponds to local modeling. The propagation restarts from these stopped voxels (fronts) after their cumulative cost measures $\phi$ are readjusted based on local cost computation. Ideally, propagation should start only from the voxels in the centers of vessels and a minimum amount of growth should take place from the voxels that are close to the vessel boundaries or outside boundaries. However, classifying fronts into two classes is very difficult and dangerous. In fact, stopping the propagation from certain voxels may result in missing several important branches.

In our approach, the cumulative cost measure of discrete fronts are reinitialized by measuring the amount of vesselness near them. Specifically, a temporary individual front propagation starts from each of these front voxels only in the direction where they have been propagated and the local cumulative cost, $\phi_0$ is computed by accumulating costs in such local propagations. Then accumulative cost measures of fronts are initialized from these local cumulative costs, e.g., $\phi(N_i)=\phi_0(N_i)$ where $N_i$s are the stopped fronts. The main idea here is to assign very low cumulative cost measures for the voxels that are in the center of the vessels and much higher values for others. It should be noted that when the propagation restarts from the stopped fronts, it is not allowed to explore the previously explored areas. This iterative local minimum-cost path detection algorithm is repeated until the convergence criteria is reached. Observe that the temporary propagation of fronts for the computation of the local cumulative costs $\phi_0$ is not necessary if they have not propagated earlier. This case occurs very often and reduces the computational time significantly. In our current implementation, we use the local cumulative cost measure $\phi_0$ obtained at the beginning of each new propagation to determine the stopping criteria. Specifically, if arg $\min_i(\phi_0(N_i))$ is more than a threshold, the propagation is stopped. FIG. 6 compares this iterative algorithm (see (b) in FIG. 6) with the local algorithm (see (a) in FIG. 6) after running the same number of iterations.

Figure 7:
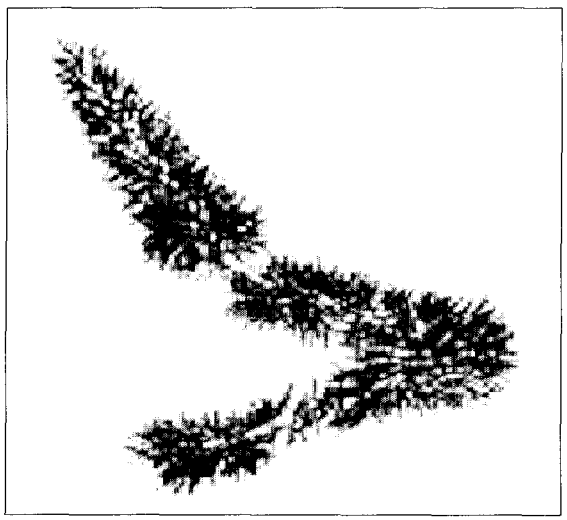
FIG. 7 illustrates a branch removal process according to an exemplary embodiment of the present invention.
Figure 7:
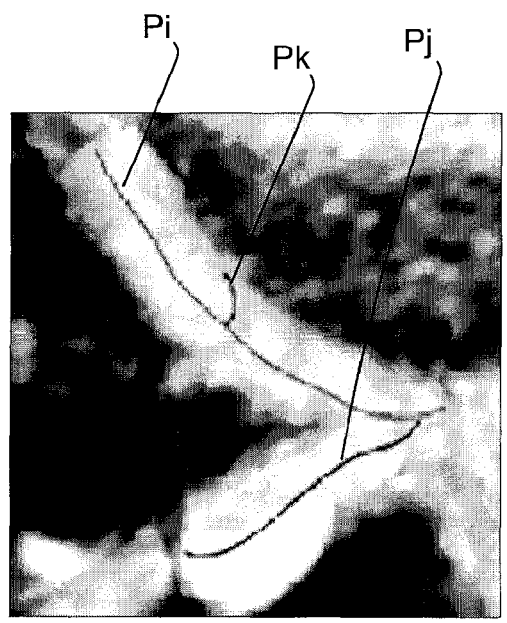
Figure 8:
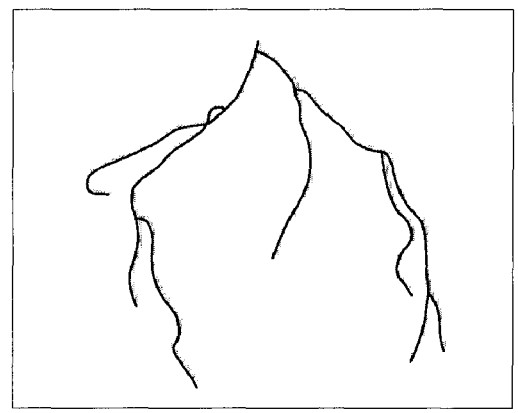
FIG. 8 illustrates centerline models of two coronary arteries in Computed Tomography Angiography (CTA) and a cerebral artery in three-dimensional (3D) X-ray according to an exemplary embodiment of the present invention.
Figure 8:
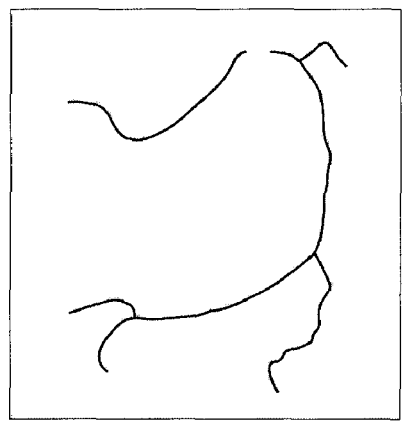
Figure 8:
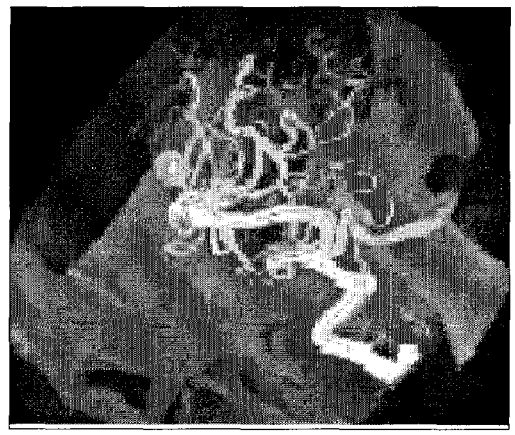

While this iterative minimization algorithm constructs the cumulative cost map, $\phi$ and the history map H, it does not explicitly detect centerlines of vessel trees since there are no user placed end points. Observe that it is possible to detect a minimum-cost path between front pixels and the source (see (a) in FIG. 7). Most of these paths correspond to the discontinuities of the propagating fronts. We propose that the determination of correct paths depends on their saliency. The saliency of a branch is determined from the size of the branch and the size of a maximum vesselness filter along that branch. Specifically, we first determine a front that has the maximum distance from the source. This first path is marked as the discrete centerline. Then iterative discrete path detection is applied to each front point based on its distance from the source. The centerline tracking, which uses the history map, H, stops if the tracking reaches an already detected centerline. This is illustrated in FIG. 7, specifically, (a) of FIG. 7 shows the fronts and their associated minimum-cost paths. Now, as shown in (b) of FIG. 7, suppose a path $P_i$ starts from front $N_i$ with the maximum distance value. Since paths $P_j$ and $P_k$ are tracked later, they stop when they reach path $P_i$. In this case, $P_j$ is kept since its length is much greater than its maximum scale. However, path $P_k$ is pruned since its scale and length are very similar. This criteria works very well on determining salient paths and removing branches due to the discontinuities on the fronts. FIG. 8 shows the centerline models obtained from this algorithm ((a) and (b) in FIG. 8 show two coronary arteries in CTA and (c) in FIG. 8 shows a cerebral artery in 3D X-ray). The results in FIG. 8 were obtained via a single seed placement. The algorithm took around 20 seconds on a 2.8 GHz PC to obtain these centerline models.

Vessel Surface Modeling via 2D Cross-Sectional Boundaries

The center axis representation by itself is important in constructing curve multiplanar reconstruction (MPR) visualization, which is popular in clinical applications. However, vessel surface representation in addition to centerlines is needed in quantification of pathologies, stent planning and follow-up studies. Traditionally, vessel surface models are created by the scale information contained in the centerline representation. For example, in S. Aylward and E. B. E. Initialization, noise, singularities, and scale in height-ridge traversal for tubular object centerline extraction. TMI, 21(2):61-75, 2002, each centerline point is associated with scale information which is then used to construct the vessel boundaries. Similarly, our centerline points are also associated with a scale that gives the maximum vesselness response. However, this scale information is not accurate enough to fully represent vessel surface models since they are designed to be computationally efficient, e.g., less accurate. In the following, we propose to construct the vessel surface models with sub-voxel 2D cross-sectional models.

We have recently presented a robust and accurate method for the vessel cross-sectional boundaries, see H. AAAA, A. Ayvaci, and D. Comaniciu. Multi-scale vessel boundary detection. In Workshop of CVBIA, pages 388-398, 2005; and M. A. Gulsun and H. Tek. 3d construction of coronary arteries. In International Workshop on Computer Vision for Intravascular and Intracardiac Imaging, MICCAI, 2006 (the disclosure of which is incorporated by reference herein in its entirety). Specifically, the cross-sectional boundaries are computed accurately and robustly by using a minimum mean cycle optimization algorithm as described, e.g., in I. Jermyn and H. Ishikawa. Globally optimal regions and boundaries as minimum ratio cycles. IEEE Trans. PAMI, 23(10): 1075-1088, 2001 (the disclosure of which is incorporated by reference herein in its entirety), operating on a novel cyclic graph. The main idea behind the minimum mean cycle algorithm is to find a cycle (contour) in a graph such that its average cost is the minimum. Average cost of a cycle is the division of the sum of all edge weights on the cycle by its length, the number of edges on the cycle. The sub-voxel accuracy is guaranteed by the use of a cost function computed from the multi-scale means shift based edge responses as described, e.g., in D. Comaniciu and P. Meer. Mean shift: A robust approach toward feature space analysis. IEEE Trans. PAMI, 24(5):603-619, 2002; and H. AAAA, A. Ayvaci, and D. Comaniciu. Multi-scale vessel boundary detection. In Workshop of CVBIA, pages 388-398, 2005. FIG. 9 illustrates the cross-sectional boundary detection results from the proposed algorithm on coronary boundaries, carotid arteries with strong calcifications.

FIG. 9 particularly illustrates the 2D cross-sectional boundaries obtained from the algorithm described in M. A. Gulsun and H. Tek. 3d construction of coronary arteries. In International Workshop on Computer Vision for Intravascular and Intracardiac Imaging, MICCAI, 2006, on three different cases: coronary (see (a)), calcification (see (b)) and branch (see (c)). As can be seen, this algorithm produces accurate subvoxel results even when the vessels contain noise due to the pathologies being near other bright structures.

Figure 10:
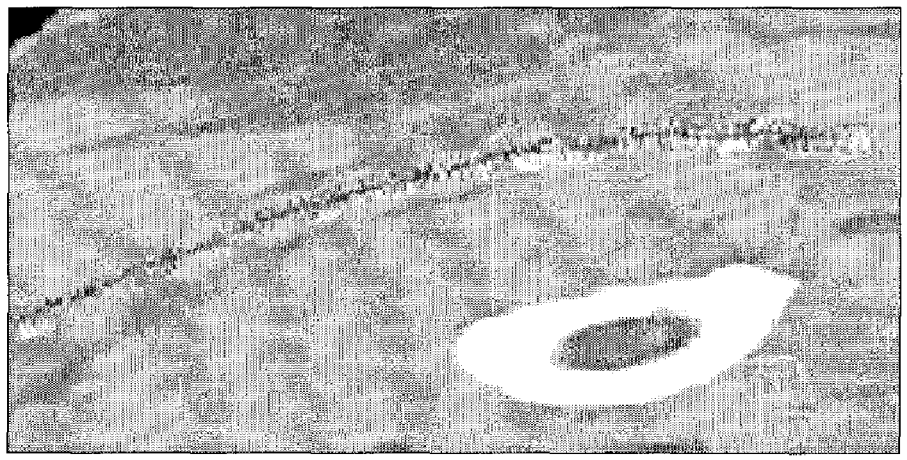
FIG. 10 illustrates centerline and cross-sectional models and surface models for a peripheral artery with strong calcifications in CTA according to an exemplary embodiment of the present invention.
Figure 10:
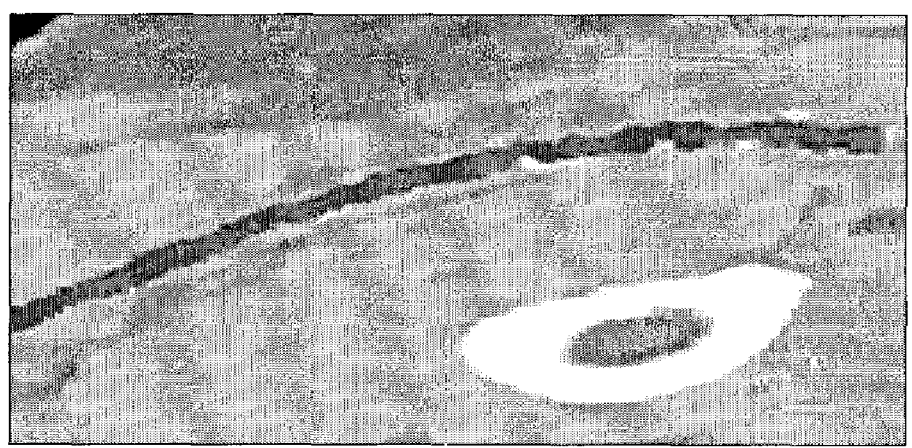

Our vessel surface construction method is based on this 2D cross-sectional segmentation. Specifically, accurate sub-voxel vessel cross-sectional boundaries are constructed at several locations of a given centerline model. A 3D vessel surface model is then constructed from these 2D contours. Specifically, successive 2D contours are used to construct the local triangulation surface by finding the corresponding points of each contour, e.g., points that are closest to each other. The surface models constructed from this proposed algorithm are shown in FIG. 10. In particular, FIG. 10 shows the centerline and cross-sectional models in (a) and surface models in (b) for a peripheral artery with strong calcifications in CTA.

Validations and Discussions

Figure 11A:
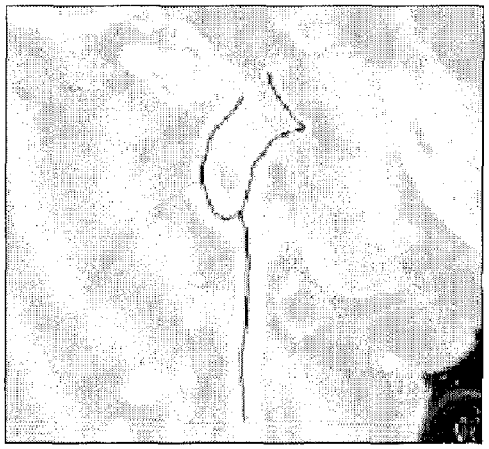
FIGS. 11A and 11B illustrate results obtained from performing vessel tree modeling according to an exemplary embodiment of the present invention.
Figure 11A:
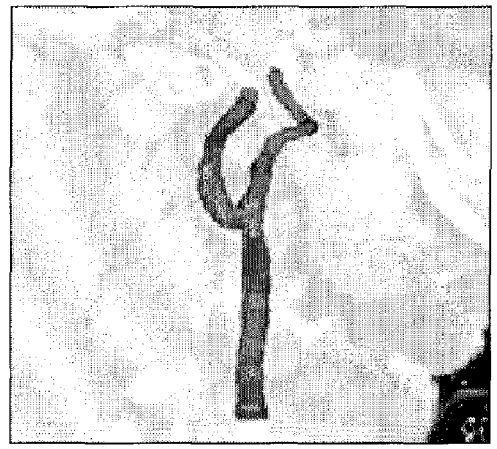
Figure 11A:
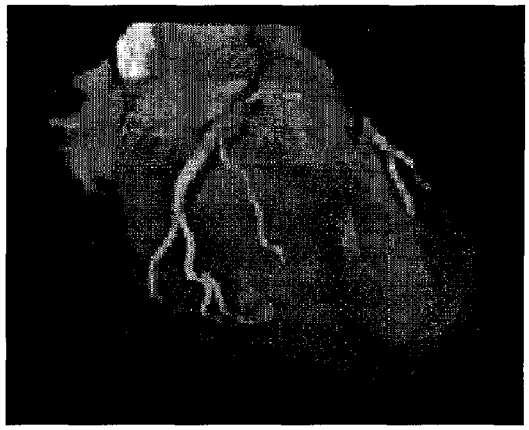
Figure 11A:
Figure 11B:
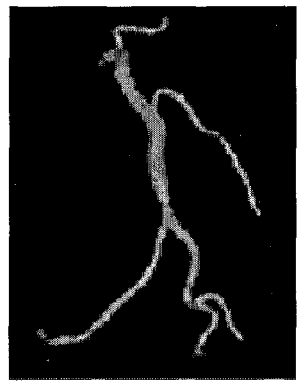
Figure 11B:
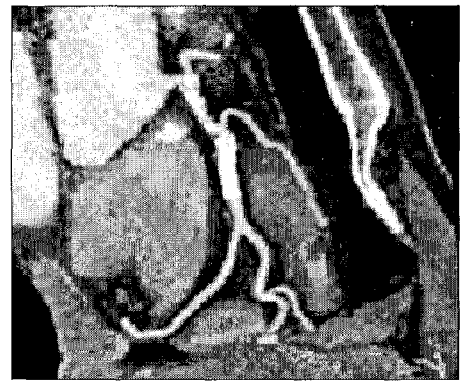
Figure 11B:
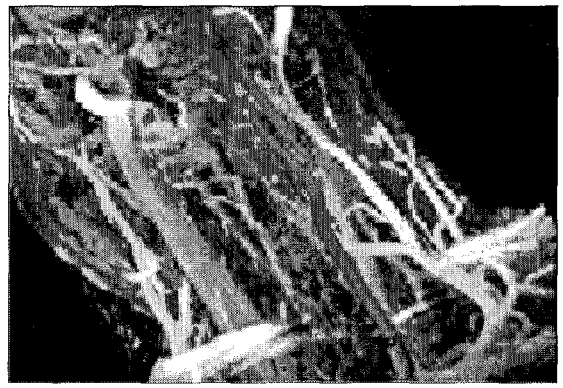
Figure 11B:
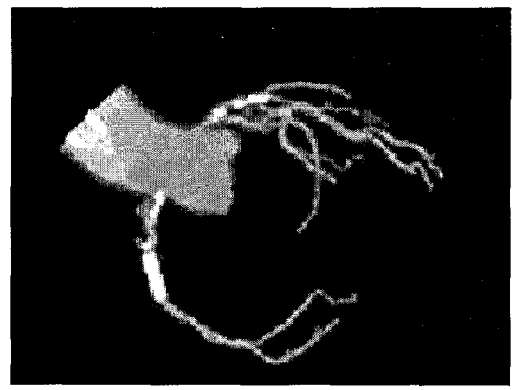

Our algorithm has been successfully testes on more than 50 data sets for the construction of coronary, carotid, aorta and peripheral artery models. In our experiments, a user often placed a single seed at an artery of interest and the algorithm was capable of producing results in less than 30 seconds on a 2.8 GHz PC. For example, it took an average 22 seconds for the centerline extraction of the left coronary artery tree on 10 different data sets. FIGS. 11A and 11B illustrate some of the results obtained from our algorithm.

coronary, 3 carotid, 3 peripheral and 2 aorta data sets. Our algorithm was able to capture all the major vessel branches in all experiments. In coronary validations, our algorithm was able to extract 95% of expert constructed coronary trees. In all other datasets, this ratio was 100%. In addition to the number of branches extracted, we compared the locations of centerlines with respect to the average radius of the vessels. Our algorithm performed very well on aorta, carotid and peripheral arteries where average errors were less than 15%. Since coronary arteries occupy a relatively small area this error was around 20%, which often corresponds to less than a voxel size. Table 1 illustrates some of the validation results in actual mm in 5 different data sets including pathologies. Specifically, Table 1 illustrates the error in mm between the computed and expert-constructed vessel centerline trees for 5 different patients. The representation (x±y); z describes: x the average error, y the standard deviation and z the maximum error.

TABLE 1

| | Patient1 | Patient2 | Patient3 | Patient4 | Patient5 |
|---|---|---|---|---|---|
| vessel type | carotid | coronary | coronary | coronary | peripheral |
| pathologic conditions | calcification | stent, calcification | none | plaques | calcification |
| errors | (0.5 ± 0.21); 1.08 | (0.35 ± 0.17); 1.19 | (0.38 ± 0.27); 1.67 | (0.39 ± 0.22); 1.39 | (0.64 ± 0.42); 3.59 |

In FIGS. 11A and 11B, we visualized the centerlines and the segmented vessels in our advanced vessel visualization tool. Specifically, this visualization fuses the centerline tree and the intensities on constructed vessel surface models (triangular mesh structure) with the original data with the constraint that segmented vessels are always visible. This type of visualization allows the user to read the vessels very quickly. Based on our experiments, the errors in surface and centerline models significantly degrade the quality of this visualization. By using our centerline and surface models, such visualization can be used in real applications without creating erroneous stenosis.

In the visualizations shown in FIGS. 11A and 11B, the computed surface models with their original intensity are fused with the original data with the constraint that segmented vessels are always visible. For example, in FIGS. 11A and 11B: (a) shows the centerline tree for a carotid artery; (b) shows the fusion of carotid surface model to the original data; (c) shows the fusion of coronary surface models in volume rendering after heart isolation; (d) shows the fusion of coronary surface models in volume rendering after heart isolation; (e) shows the surface model of a coronary tree including a stent; (f) shows the fusion of intensity values on this coronary surface with the original data; (g) shows the surface model of a carotid artery from MS-235 enhanced MRA which highlights both arteries and veins; and (h) shows the binary mask of coronary arteries.

We performed validations for the accuracy of centerlines and cross-sectional boundaries. In general, creating ground truth for centerline models of vessel is difficult and can be extremely time consuming for an expert. To make the expert's task easier, we designed a manual vessel centerline creation tool where the user first places a seed point in the center of vessels. Second, our tool creates 2D orthogonal and tangential images by using newly placed and previously placed seed points. Third, the expert user corrects the location of seeds, if they are not correct. With this tool, it takes an expert around 30 minutes to create centerlines of a typical coronary dataset. In our validations, the expert created centerline trees for 20

In addition to centerline validations, we compared the cross-sectional results with expert created results on data sets containing coronary, carotid, aorta and peripheral arteries. In general, validation studies of the cross-sectional boundaries of coronary arteries are quite difficult. Specifically, first, the expert drawn contours are can change drastically based on the window/level settings of the original images. Second, we have observed that the contours obtained from two different experts have exhibited some significant errors. In any case, we have performed validations of 2D cross-sectional boundaries on 14 different patient data: 8 coronary, 2 carotid, 2 peripheral and 2 aorta. Specifically, for each patient we compared the detected contours against the expert drawn contours in 20 different locations or a coronary branch including places with high calcium, stent and very small diameters. In our comparison experiments, each contour is described by 48 contour points. Let $C_i$ represent a point on the expert created contour. Similarly, let its corresponding point on the computed contour be represented by $\hat{C}_i$. We use the distance between corresponding points, e.g., $|C_i - \hat{C}_i|$ as the error measure. We found that average errors for coronary vessels are in the range of 0.25 mm or well below a voxel size. The average of maximum error is 0.4 mm for these data sets. We also compared the stenosis measurements obtained from the algorithm and the ones obtained from an expert. The errors found tended to be relatively small.

Presented above is a novel algorithm for the extraction of center axis representation as well as surface models for blood vessels. The accuracy of the algorithm has been successfully demonstrated on many CE-CTA/MRA datasets. Based on this, we expect the algorithm to be successfully used in diagnosis, treatment planning and follow-up studies of vascular structures.

A system in which exemplary embodiments of the present invention may be implemented will now be described.

Figure 12:
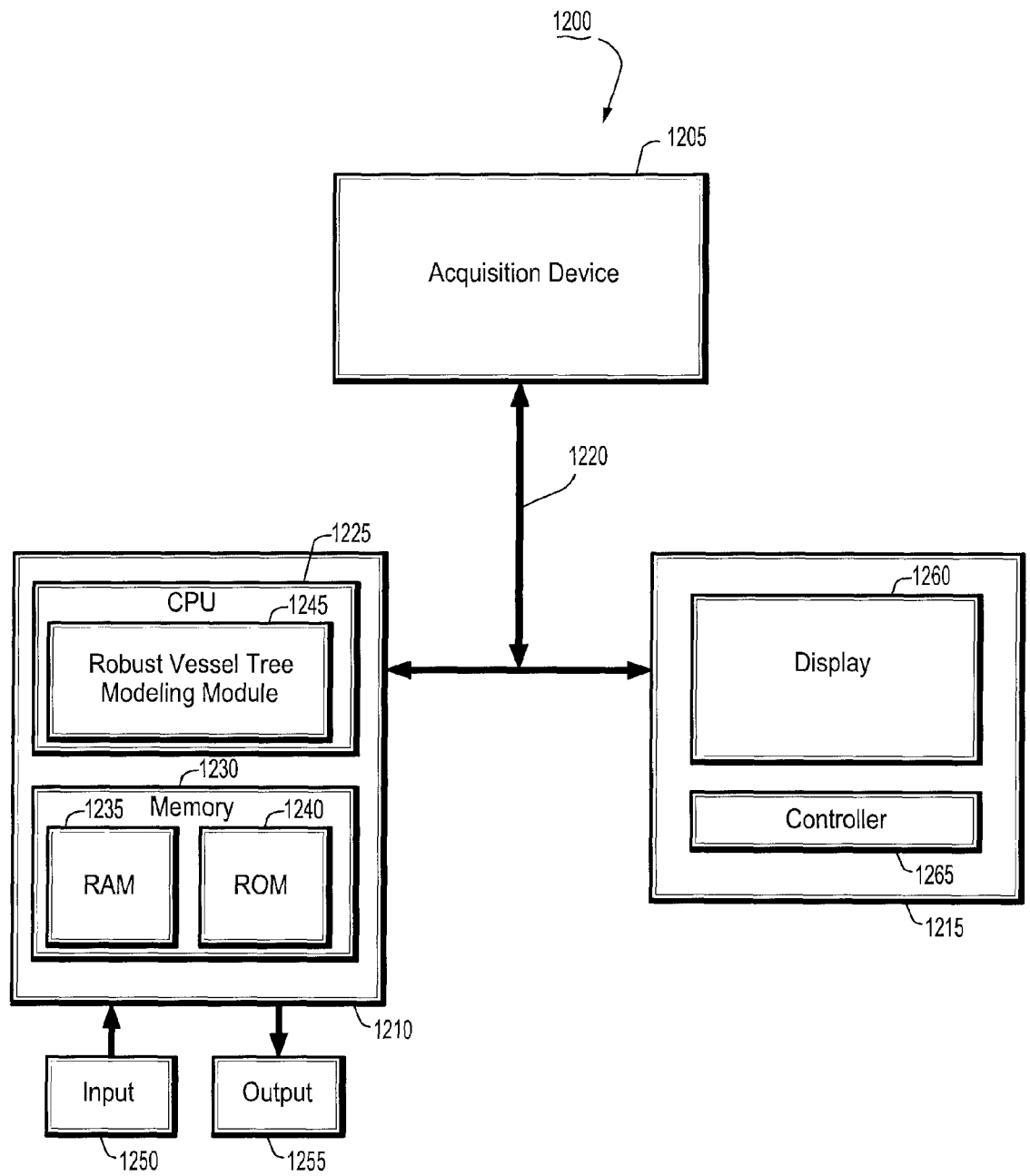
FIG. 12 illustrates a system in which exemplary embodiments of the present invention may be implemented.

As shown in FIG. 12, a system 1200 includes an acquisition device 1205, a personal computer (PC) 1210 and an operator's console 1215 connected over a wired or wireless network 1220. The acquisition device 1205 may be a CT imaging device or any other three-dimensional (3D) high-resolution imaging device such as a magnetic resonance (MR) scanner or ultrasound scanner.

The PC 1210, which may be a portable or laptop computer, a medical diagnostic imaging system or a picture archiving communications system (PACS) data management station, includes a central processing unit (CPU) 1225 and a memory 1230 connected to an input device 1250 and an output device 1255. The CPU 1225 includes a robust vessel tree modeling module 1245 that includes software for executing methods in accordance with exemplary embodiments of the present invention. Although shown inside the CPU 1225, the robust vessel tree modeling module 1245 can be located outside the CPU 1225.

The memory 1230 includes a random access memory (RAM) 1235 and a read-only memory (ROM) 1240. The memory 1230 can also include a database, disk drive, tape drive, etc., or a combination thereof. The RAM 1235 functions as a data memory that stores data used during execution of a program in the CPU 1225 and is used as a work area. The ROM 1240 functions as a program memory for storing a program executed in the CPU 1225. The input 1250 is constituted by a keyboard, mouse, etc., and the output 1255 is constituted by a liquid crystal display (LCD), cathode ray tube (CRT) display, printer, etc.

The operation of the system 1200 can be controlled from the operator's console 1215, which includes a controller 1265, e.g., a keyboard, and a display 1260. The operator's console 1215 communicates with the PC 1210 and the acquisition device 1205 so that image data collected by the acquisition device 1205 can be rendered by the PC 1210 and viewed on the display 1260. The PC 1210 can be configured to operate and display information provided by the acquisition device 1205 absent the operator's console 1215, by using, e.g., the input 1250 and output 1255 devices to execute certain tasks performed by the controller 1265 and display 1260.

The operator's console 1215 may further include any suitable image rendering system/tool/application that can process digital image data of an acquired image dataset (or portion thereof) to generate and display images on the display 1260. More specifically, the image rendering system may be an application that provides rendering and visualization of medical image data, and which executes on a general purpose or specific computer workstation. The PC 1210 can also include the above-mentioned image rendering system/tool/application.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for computing a vesselness measure, comprising:

initializing a plurality of rays from a center point of a vessel and collecting an intensity profile of the vessel and a background of the vessel along each ray;

modeling each intensity profile by dividing the intensity profile into first, second and third intervals, wherein the first interval represents an intensity value inside the vessel, the second interval represents an intensity value outside the vessel and the third interval represents an intensity value between a boundary of the vessel and the background;

for each ray, obtaining a difference between an originally measured intensity profile of the vessel and the background and the originally measured intensity profile's corresponding modeled intensity profile, wherein the difference is a fit measure of the ray, the fit measure is given by $$f_i = \arg\min_{R,\sigma}$$

$$\left( \gamma_1 \sum_{x=0}^{R} \|V_i(x, R, \sigma) - I_i(x)\|^2 f(x) + \gamma_2 \sum_{x=R}^{x_0} \|V_i(x, R, \sigma) - I_i\|^2 + \gamma_3 \sum_{x=x_B}^{x_B} \|V_i(x, R, \sigma) - I_i\|^2 g(x) \right)$$

where $f(x) = u(I_v - I(x))$, $g(x) = u(I(x) - I_o)$, $u(x)$ is a step function, $\gamma_1$, $\gamma_2$, and $\gamma_3$ are weights for the first to third intervals, respectively, $V_i$ is a vessel model along the ray, R is the radius of the ray, $I_v$ is the intensity value inside the vessel and $I_o$ is the intensity value outside the vessel; and summing the fit measures for each ray, wherein the total sum is the vesselness measure.

2. The method of claim 1, wherein the vesselness measure along a ray is strong near a center of the ray, drops rapidly near a boundary of the ray and is weak in a non-vascular area between the ray and another ray.

3. The method of claim 1, wherein the vessel is a blood vessel.

4. A system for computing a vesselness measure, comprising:

a memory device for storing a program;

a processor in communication with the memory device, the processor operative with the program to:

initialize a plurality of rays from a center point of a vessel and collect an intensity profile of the vessel and a background of the vessel along each ray;

model each intensity profile by dividing the intensity profile into first, second and third intervals, wherein the first interval represents an intensity value inside the vessel, the second interval represents an intensity value outside the vessel and the third interval represents an intensity value between a boundary of the vessel and the background;

for each ray, obtain a difference between an originally measured intensity profile of the vessel and the background and the originally measured intensity profile's corresponding modeled intensity profile, wherein the difference is a fit measure of the ray, the fit measure is given by $$f_i = \arg\min_{R,\sigma} \left( \gamma_1 \sum_{x=0}^{R} \|V_i(x, R, \sigma) - I_i(x)\|^2 f(x) + \gamma_2 \sum_{x=R}^{x_0} \|V_i(x, R, \sigma) - I_i\|^2 + \gamma_3 \sum_{x=x_B}^{x_B} \|V_i(x, R, \sigma) - I_i\|^2 g(x) \right)$$

where $f(x)=u(I_v - I(x))$, $g(x)=u(I(x) - I_o)$, $u(x)$ is a step function, $\gamma_1$, $\gamma_2$, and $\gamma_3$ are weights for the first to third intervals, respectively, $V_i$ is a vessel model along the ray, R is the radius of the ray, $I_v$ is the intensity value inside the vessel and $I_o$ is the intensity value outside the vessel; and sum the fit measures for each ray, wherein the total sum is the vesselness measure.

5. The system of claim 4, wherein the vesselness measure along a ray is strong near a center of the ray, drops rapidly near a boundary of the ray and is weak in a non-vascular area between the ray and another ray.

* * * * *